(12) United States Patent  (10) Patent No.: US 9,107,401 B1
Brajovic et al.  (45) Date of Patent: Aug. 18, 2015

(54) APPARATUS AND METHOD TO ATTRACT ANIMALS

(75) Inventors: Vladimir M. Brajovic, Pittsburgh, PA (US); John M. Petrone, Pittsburgh, PA (US)

(73) Assignee: PRIMOS, INC., Flora, MS (US)

( * ) Notice: Subject to any disclaimer, the term of this patent is extended or adjusted under 35 U.S.C. 154(b) by 811 days.

(21) Appl. No.: 13/281,341

(22) Filed: Oct. 25, 2011

(51) Int. Cl.
*A01M 31/06* (2006.01)

(52) U.S. Cl.
CPC ..................... *A01M 31/06* (2013.01)

(58) Field of Classification Search
USPC ........................................... 43/2, 3
See application file for complete search history.

(56) References Cited

U.S. PATENT DOCUMENTS

| | | | | |
|---|---|---|---|---|
| 5,459,958 A * | 10/1995 | Reinke | | 43/2 |
| 7,082,710 B1 * | 8/2006 | Jorgenson | | 43/2 |
| 7,627,977 B2 * | 12/2009 | Denny | | 43/2 |
| 7,958,666 B2 * | 6/2011 | Rogers | | 43/2 |
| 8,051,598 B2 * | 11/2011 | Stillwell | | 43/2 |
| 2005/0204605 A1 * | 9/2005 | Brauner et al. | | 43/4 |
| 2010/0064569 A1 * | 3/2010 | Wyant | | 43/2 |

* cited by examiner

*Primary Examiner* — Christopher P Ellis
(74) *Attorney, Agent, or Firm* — Holland & Hart

(57) ABSTRACT

An apparatus to attract predatory animals is described. The apparatus includes an end-effector that includes an elastic member with non-homogenous elastic properties. The apparatus further includes a fixture attached to a proximal end of the elastic member. In addition, the apparatus includes an actuator attached to the fixture generates a transversal wave excitation. The transversal wave excitation propagates from the proximal end of the elastic member to a distal end of the elastic member.

36 Claims, 20 Drawing Sheets

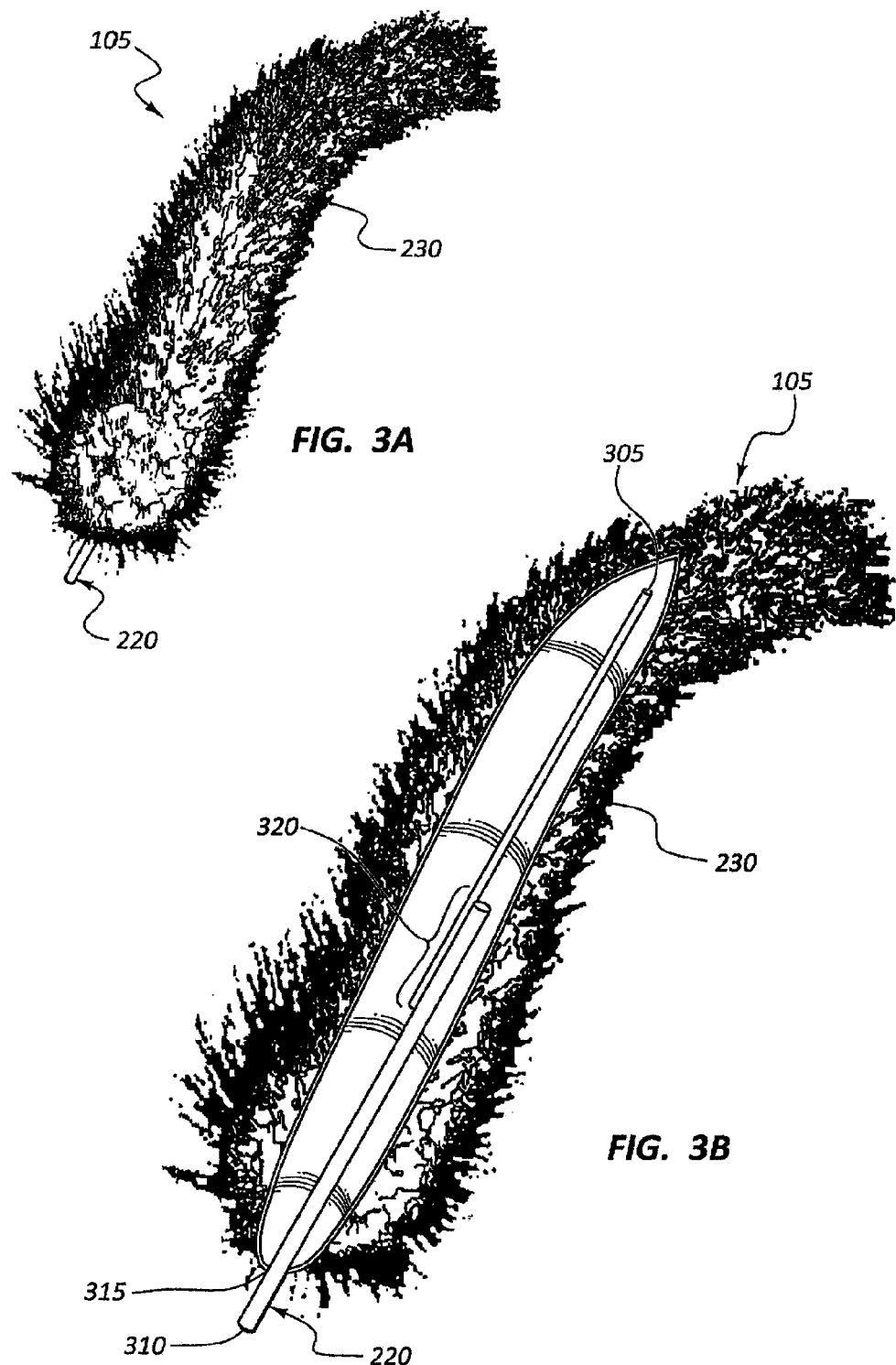

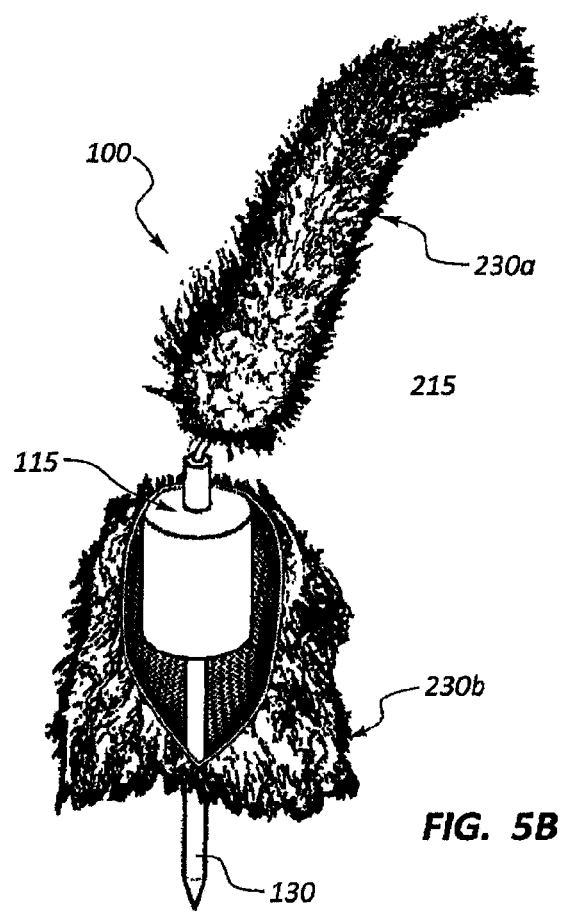
FIG. 5A
FIG. 5B

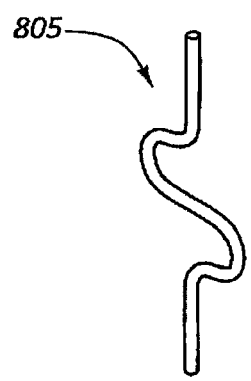
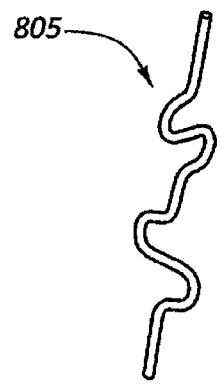
FIG. 9A  FIG. 9B
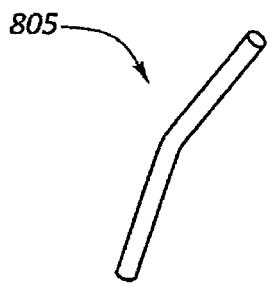
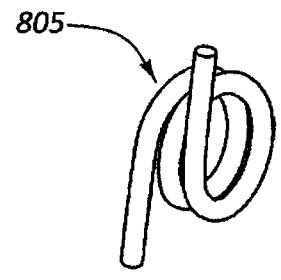
FIG. 9C  FIG. 9D
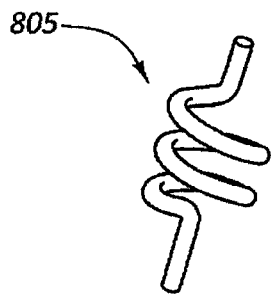
FIG. 9E

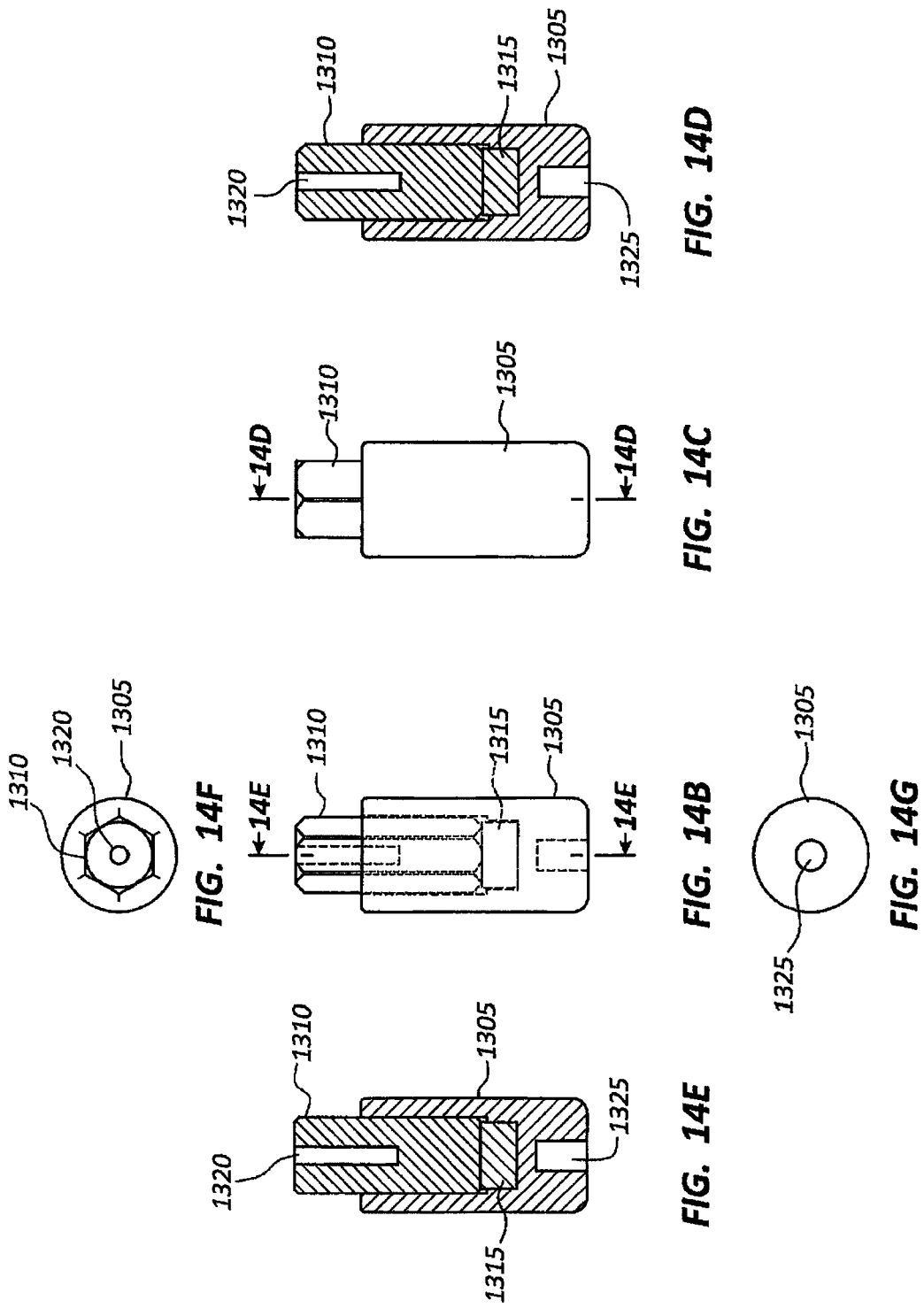

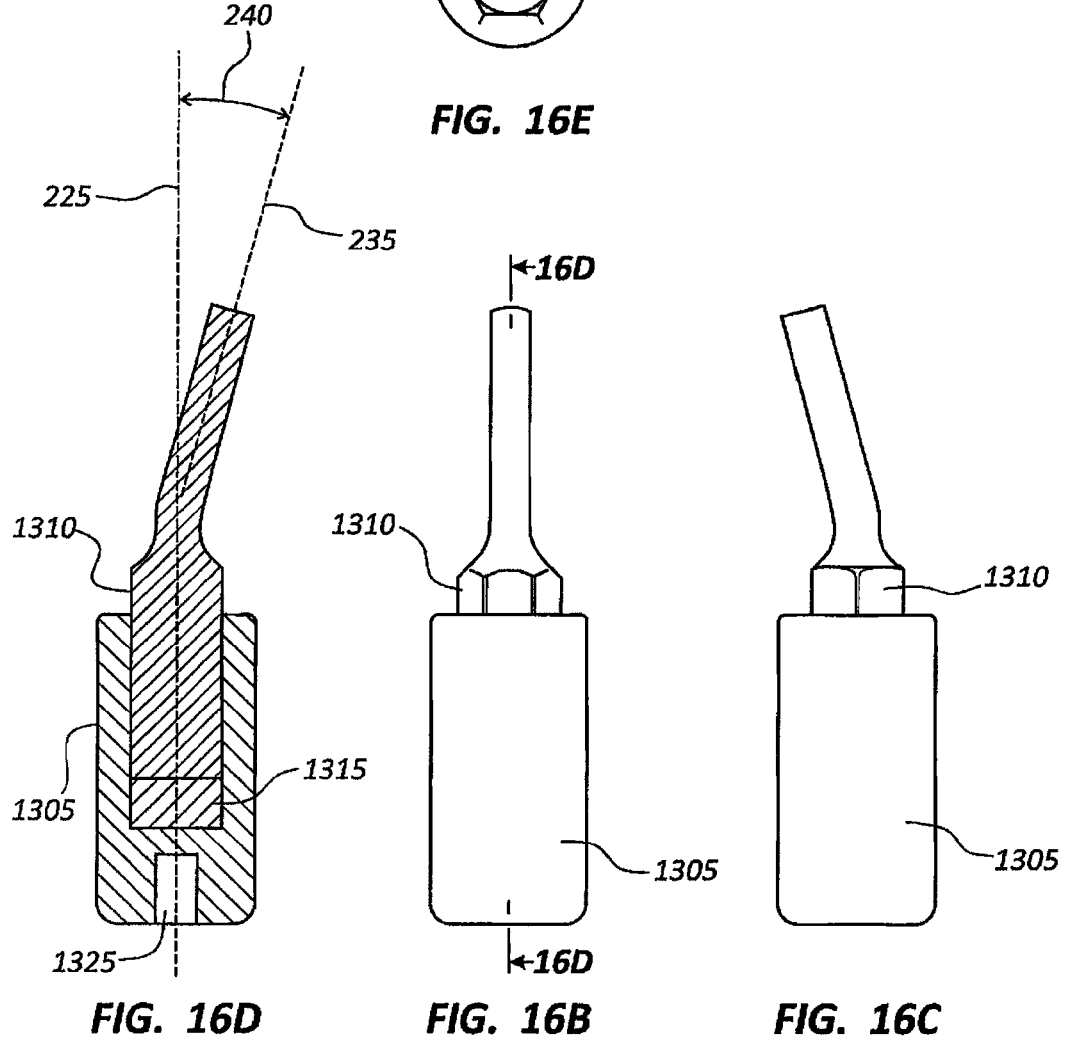

APPARATUS AND METHOD TO ATTRACT ANIMALS

BACKGROUND

Decoys have been used in the sport of hunting to attract the attention of an animal. To successfully attract an animal of interest, the decoy should be as realistic as possible. For example, the color, texture, shape, etc. of the decoy should be accurate to successfully lure the desired animal to the decoy. The more accurately the decoy creates the allusion of a live animal, the more successful a hunter will be in attracting the desired animal into range of the decoy.

A hunter may use decoys in conjunction with hunting calls. For example, the hunter may place a decoy on the ground and then use a hunting call to simulate the sound of a particular animal represented by the decoy. This combination may lure an unsuspecting animal to the area where the decoy is placed. Decoys and hunting calls have been successful tools for hunters of game animals.

Hunters and members of certain organizations, such as, wildlife preserve organizations, may desire to attract the attention of a predatory animal. For example, it may be desirable to attract a wolf, mountain lion, etc. Current decoys to attract such animals lack the ability to accurately simulate the movement of prey sought after by these predatory animals. Predatory animals have an acute sense of awareness and are not attracted to decoys that do not correctly simulate natural life movements of animals. Current decoys do not produce this highly realistic like-like motion to attract the predatory animals. As a result, benefits may be realized by providing a method and apparatus for attracting predatory animals.

SUMMARY OF THE INVENTION

An apparatus to attract predatory animals is described. The apparatus includes an end-effector that includes an elastic member with non-homogenous elastic properties. The apparatus further includes a fixture attached to a proximal end of the elastic member. In addition, the apparatus includes an actuator attached to the fixture generates a transversal wave excitation. The transversal wave excitation propagates from the proximal end of the elastic member to a distal end of the elastic member.

A method to attract attention of predatory animals is also described. A proximal end of an elastic member of an end-effector may be attached to a fixture. The elastic member may include non-homogenous elastic properties. In one configuration, the fixture may be attached to an actuator. The actuator may generate a transversal wave excitation. The transversal wave excitation may propagate from the proximal end of the elastic member to a distal end of the elastic member.

An animated decoy apparatus for attracting the attention of a predatory animal is also described. The apparatus may include an end-effector that includes an elastic member with non-homogenous elastic properties. The apparatus may also include an end-effector covering simulating at least a portion of an animal body. The covering may be attached to at least a portion of the elastic member. A fixture may be attached to a proximal end of the elastic member. The fixture may transmit a mechanical transversal wave excitation to the proximal end of the elastic member. In one embodiment, the excitation produces a wave to propagate from the proximal end to a distal end of the elastic member. The apparatus may further include an actuator to generate the mechanical transversal wave excitation to drive the fixture. In addition, the apparatus may include a controller to determine properties of the wave excitation and control the actuator to generate the wave excitation. Further, the apparatus may include a mounting component to mount the decoy apparatus in a location.

BRIEF DESCRIPTION OF THE DRAWINGS

A complete understanding of the present invention may be obtained by reference to the accompanying drawings, when considered in conjunction with the subsequent, detailed description, in which:

FIG. 3A is an example of an end-effector;

FIG. 3B illustrates a cross-sectional view of the end-effector;

FIG. 5A illustrates the decoy system with an upper decoration section and a lower decoration section;

FIG. 5B, the decoy system, is further illustrated with the lower decoration section draped and/or affixed over the decoy enclosure;

FIGS. 9A-9E illustrate additional examples of the kink that may be included in the elongated elastic member;

FIGS. 14B-14G illustrate further embodiments of the female socket and male socket used with the actuator;

FIG. 16B-16F illustrate various example of securing the male insert;

DETAILED DESCRIPTION OF EXEMPLARY EMBODIMENTS

The present systems and methods provide an animated robotic decoy that simulates movement of natural life to attract attention of predatory-minded animal species. For example, the movement may simulate body motion, or body part motion of an animal that a predator may perceive as prey or as a competing species. In one embodiment, the present system and methods may be used with a hunting call that simulates sounds of natural life. The hunting call may attract predatory animals from a wide range of distances. Once the predator approaches the apparent source of the sound, the decoy of the present systems and methods may provide the predator with a visual confirmation of the apparent source of sound. Due to the simulated movement of the decoy, the predator may be instinctively mesmerized and placed in the mental state that may allow hunters and animal control professional to be successful in capturing the predator.

Figure 1:
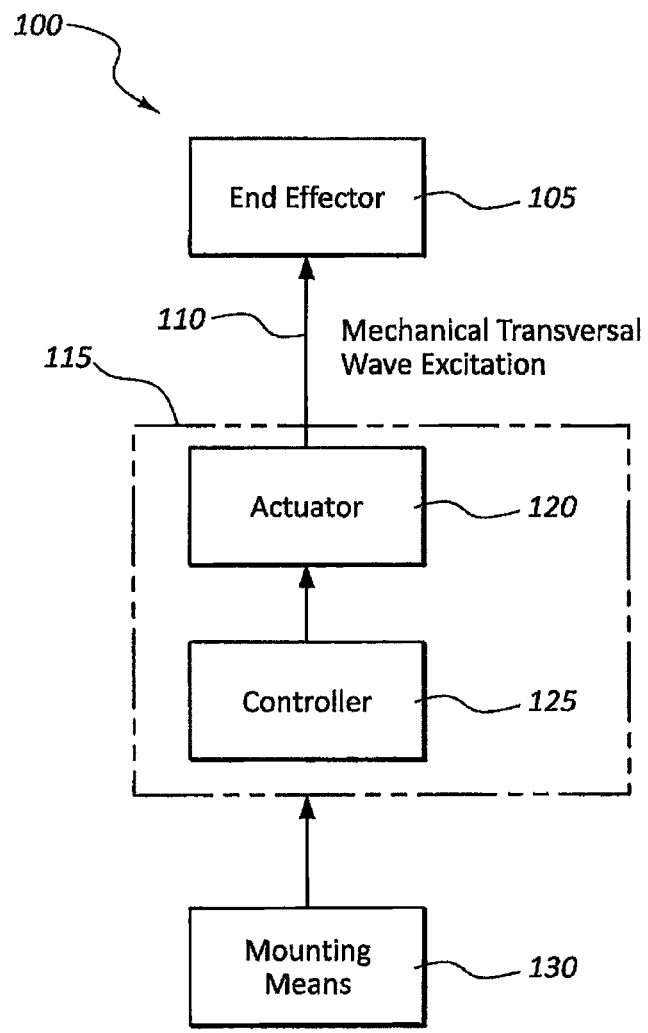
FIG. 1 illustrates one example of a decoy system in accordance with the present systems and methods.

Referring to FIG. 1, a block diagram illustrates one example of a decoy system 100 in accordance with the present systems and methods. The decoy system 100 may include an end-effector 105, an enclosure 115, and a mounting means 130. In one embodiment, the enclosure 115 may include an actuator 120 and a controller 125. The actuator 120 may be controlled by the controller 125. In one example, the actuator 110 may generate a mechanical transversal wave excitation 110 in response to commands from the controller 125. The end-effector 200 may be coupled to the actuator 120 using one or more wires. The one or more wires may move in accordance with the generated mechanical transversal wave excitation 110. As a result, the end-effector may also move according to the wave 110 traversing through the one or more wires connecting the end-effector 105 to the actuator 120. The decoy system 100 may be mounted using the mounting means 130, which may be coupled to (and support) the decoy enclosure 115. The mounting means 130 may allow the system 100 to be mounted in the ground, in a tree, and the like. The end-effector 105 may remain visible while the remaining portions of the system 100 may be hidden. For example, the mounting means 130 and the enclosure 115 may be placed underground and the end-effector 105 may remain aboveground so as to remain visible to an animal.

Figure 2:
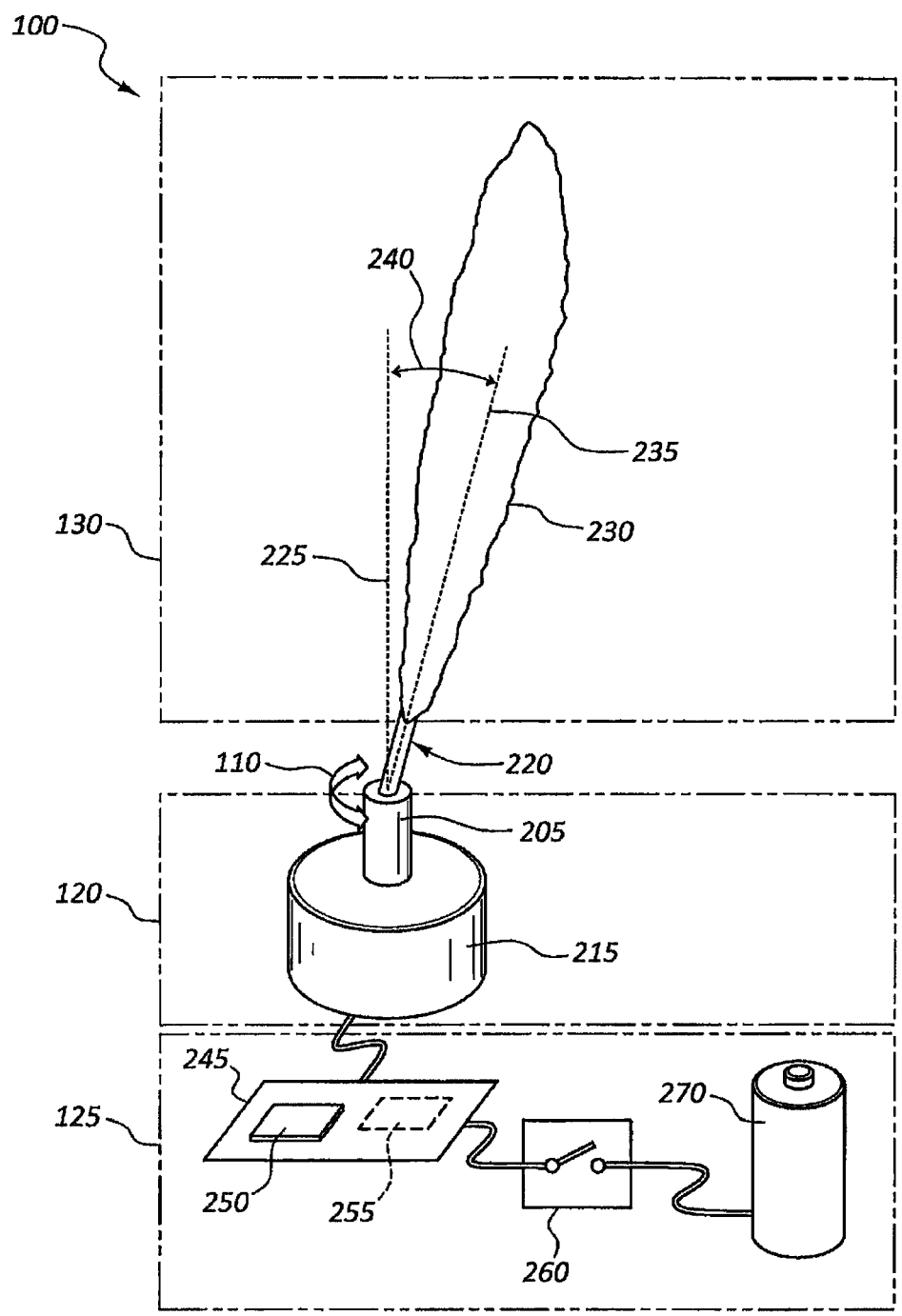
FIG. 2 illustrates a detailed view of a decoy system of the present systems and methods.

FIG. 2 illustrates a detailed view of a decoy system 100 of the present systems and methods. The decoy system 100 may be an example of the system 100 of FIG. 1. The decoy system 100 may include an end-effector 105, an actuator 120, and a controller 125.

In one embodiment the actuator 120 may be a rotary-type actuator that includes a rotary motor 215 and a fixture 205. The fixture 205 may be attached to an axel of the motor 215 using any suitable means to minimize rotary slippage of the fixture 205 against the axel of the motor 215. For example the fixture 205 may be press-fitted onto the axel of motor 215. As another example, a set screw may be used to affix the fixture 205 to the axle of the motor 215. The rotary slippage of the fixture 205 may be further minimized by keying the axle to fit a slot feature included on the fixture 205. In one configuration, the fixture 205 may be immovably attached to the axel using any of the means described above. In one example, the fixture 205 may be movably attached to the axel of the motor 215.

As described above, the actuator 215 may generate a mechanical transversal wave excitation 210. In one example, the wave 210 may be an angular-type wave. In other words, the wave 210 may be generated by a back and forth angular motion of the rotary motor 215 around a motor rotation axis 225.

In one configuration, the end-effector 105 may include a non-homogeneous elongated elastic member 220 that is associated with a principal end-effector axis 235. The end-effector may include decoration 230 that partially or fully covers the elongated member 220.

In one embodiment, the end-effector 105 may be immovably affixed to the fixture 205 in such a way that the principal end-effector axis 235 may not be collinear with the motor rotation axis 225. An end-effector angle 240 may represent the angle between the motor rotation axis 225 and the principal end-effector axis 235. In one example, as the motor 215 rotates, the principal end-effector axis 235 may sweep in a generally conical shape around the motor rotation axis 225.

The motor 215 may be controlled by the controller 125. The controller 125 may include an electronic printed circuit board 245, a processor 250 with memory for storing and executing encoded instructions and rules for generating the wave excitation 210. The controller 125 may further include a power source 270 and an optional power switch 260. In one embodiment, the controller 125 may further include a radio-frequency (RF) module 255 to allow the decoy system 100 to be operated wirelessly from a remote location. The RF module 255 may interact with the processor 250 to allow a user of the system 100 to select different types of the wave excitation 210 to be generated by the motor 215.

Various types of motors may be used to generate the wave excitation 210, including, but not limited to, direct current (DC) motors and stepper motors. The type of motor used in the decoy system 100 may determine the type of wave excitation 210 that is generated. For example, DC motors may generate pulse-width-modulation (PWM) motion while stepper motors may generate a combination of PWM and pulse frequency control motion.

Referring now to FIG. 3A, an example of an end-effector 105 is provided. The end-effector 105 may be an example of the end-effector of FIG. 2. The end-effector 105 may include an elongated elastic member 220 and tubular end-effector decoration 230. The end-effector decoration 230 may be constructed from any suitable flexible material that simulates natural life with its appearance, texture, color, scent and other attributes. For example, the decoration 230 may be constructed of the following materials: fabric, leather, strands of flexible fibers, fur-simulating fabric, natural fur, feathers, or any other suitable material. The decoration 230 may be drawn over a portion of the elongated elastic member 220. The member 220 may extend through an elongated opening of the decoration 230.

FIG. 3B illustrates a cross-sectional view of the end-effector 105. In one example, the end-effector 105 may be an example of the end-effector 105 of FIG. 2. The decoration 230 may be constricted in a tubular shape closed at one end. The end-effector decoration 230 may be drawn over the elongated elastic member 220 starting from a distal end 305 of the elastic member 220 and drawing towards a proximal end 310 of the member 220. The tubular end-effector decoration 230 may be attached to the elongated elastic member 220 using an affixing means. For example, an opening 315 of the decoration 230 may be glued shut and simultaneously affixed to the elongated elastic member 220 near the proximal end 310. As another example, glue may be applied at several locations along the elongated member 220 providing several points of adhesion between the elongated member 220 and the end-effector decoration 230. In other examples, sewing means, such as a thread and needle, may be used to affix the decoration 230 to the elastic member 220. Further, the elongated elastic member 220 may be weaved through portions of the decoration 230. The member 220 may also be wrapped around the elastic member 220. In addition, adhesive tape may be used as an affixing means. Further, ensnaring features may be provided along the elastic member 220 to grab against the end-effector decoration 230. Thus, the elongated elastic member 220 may be affixed to the end-effector decoration 230 using any of above-described affixing means as well as other affixing means that are suitable to attach the member 220 to the decoration 230.

In one embodiment, the elongated elastic member 220 may be non-homogeneous and may include discontinuities in the elastic properties of the member 220. For example, a location or section of the member 220 to which the end-effector decoration 230 is attached may introduce discontinuity in the elastic properties of the elongated member 220. In one embodiment, the member 220 may include a rod interface 320. For example, the member 220 may include multiple rods connected together at the rod interface 320. The non-homogeneous property of the elastic member 220 may allow the member 220 to accurately simulate movements of natural life to attract the attention of a predatory animal.

Figure 4A:
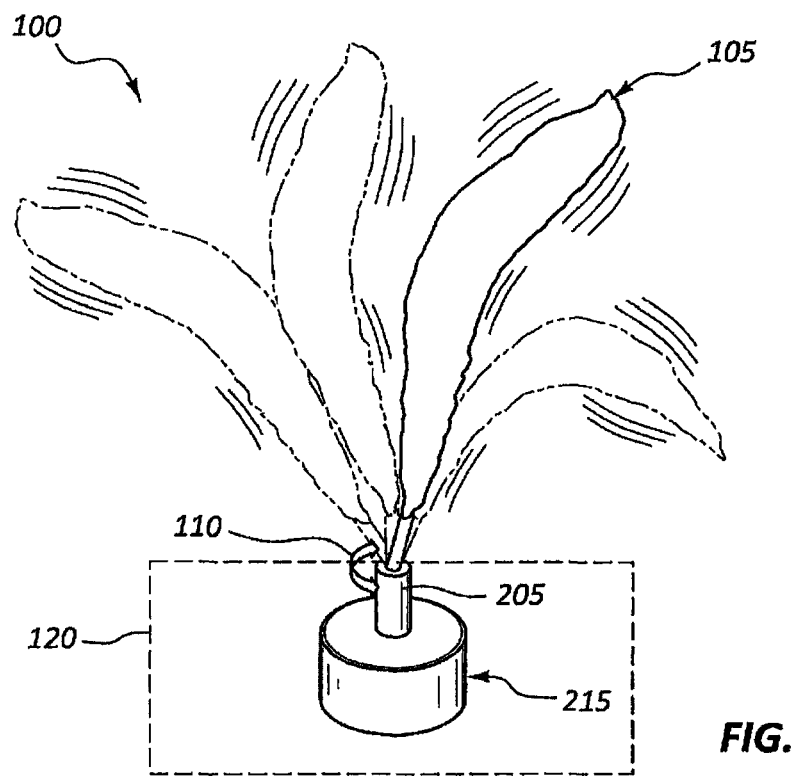
FIG. 4A is one example of the behavior of the decoy system.

Referring now to FIG. 4A, one example of the behavior of the decoy system 100 is illustrated. The behavior may be in response to the mechanical transversal wave excitation 210. The decoy system 100 may be an example of the decoy system 100 of FIG. 3A or FIG. 3B. The behavior illustrated in FIG. 4A may be referred to as a swaying motion.

In one embodiment, the proximate end 310 of the elastic member 220 of the end-effector 105 may be pushed to the side by the wave excitation 210. The displacement caused by the wave excitation 210 may take time to propagate to the distal end 305 of the elastic member 220. Due to the inertia of the distal end 305, the motion of the distal end 305 may lag behind the motion of the proximal end 310. When the motion reaches the distal end 305 of the elastic member 220, the end-effector 105 in its entirety may be in motion. If the transversal wave excitation 210 decelerates and stops at the near end 310, the distal end 305 may maintain its momentum and overshoot the position of the proximal end 310 until the stiffness of the elastic member 220 halts the forward motion and the elastic property that allowed the member 220 to bend and flex the end-effector 105 may be forced to recover the initial deformation and swing back the other way. A single transversal impulse in the wave excitation 210 that pushes the end-effector 105 to the side a finite distance, may result in an oscillation of the un-anchored distal end 305 of the elastic member 220 of the end-effector 105. The energy imparted at the proximal end 310 may be gradually dampened or absorbed by flexing the elongated elastic member 220 as well as the drag of the end-effector decoration 230 through the air.

In one configuration, the motor 215 of the actuator 120 may generate an impulse of the wave excitation 210 in the reverse direction in respect to the initial motion. In one example, causing the proximal end 310 to move in reverse may increase the distance the distal end 305 travels to swing back. As a result, momentum may be added to the return oscillation of the distal end 305 which may enhance the swaying of the end-effector 105.

As previously described, the transversal wave excitation 210 may take time to propagate from the proximal end 310 of the elastic member 220 to the distal end 305 of the member 220. In one example, for a given length of the end-effector 105, a transversal wave excitation 210 with a low frequency and large amplitude, the end-effector 105 may exhibit a swaying motion. This may occur because a low frequency wave excitation 210 may provide the distal end 305 with enough time to keep up with the movement of the proximal end 310.

Figure 4B:
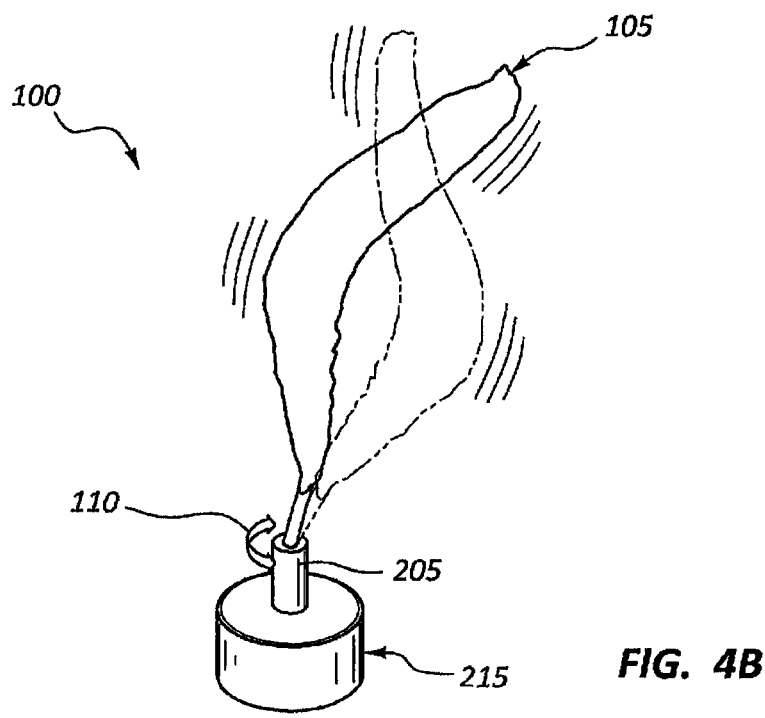
FIG. 4B illustrates the behavior and motion of the end-effector.

If the transversal wave excitation 210 is of higher frequency and lower amplitude, the end-effector 105 may exhibit a wiggling and wobbling motion. This behavior and motion is illustrated in FIG. 4B. When the proximal end 310 is quickly moved back and forth, the transversal wave excitation 210 may be reversed before the excitation 210 completely propagates to the distal end 305. In this example, the end-effector 105 may wiggle and wobble exhibiting several back and forth bends along the length of the elongated elastic member 220.

As mentioned above, the elongated elastic member 220 may be non-homogenous and may include changing elasticity properties and anisotropic discontinuities. This may cause the end-effector 105 to exhibit a chaotic life-like behavior when swaying, wiggling, wobbling, etc. In one embodiment, one section of the end-effector 105 may exhibit resonant behavior, whereas another section may exhibit different resonant behavior. The movement of these multiple sections of the end-effector 105 may conflict with each other or may be aggregated, depending on the instantaneous deformed configuration of the end-effector 105. Further, due to discontinuities that behave differently in different directions (anisotropic behavior), the resonant frequency of the end-effector 105 may have a broad-band and changing spectrum. As a result, wide range of frequencies and amplitudes in the wave excitation 210 may elicit life-like random motion and behavior of the end-effector 105.

In one embodiment, discontinuities in the elongated member 220 (such as the section 320 illustrated in FIG. 3B) may be referred to as weak spots of the end-effector 105. Depending on a particular instantaneous deformed configuration of the end-effector 105, these weak spots may be susceptible to forming a node in the wiggling wave excitation 210 traveling along the elongated elastic member 220 of the end-effector 105.

An exemplary construction and drive of the end-effector 105 will be described below. In one configuration, a twelve-inch non-homogeneous elongated elastic member 220 may be formed by overlapping and joining two seven-inch pieces of spring-tempered steel wire (also referred to as music wire). A first wire may include a diameter in the range of about 0.01 to 0.05 inches. In one example, the first wire may include a diameter of about 0.032 inches. A second wire may include a diameter in the range of about 0.01 to 0.03 inches. In one configuration, the second wire may include a diameter of about 0.015 inches. The first wire may be placed towards the proximal end 310, while the second wire may be placed towards the distal end 305. The end-effector decoration 230 may be constructed from a faux fur sawn in a tubular shape where the base mat of the faux fur forms a tube of approximately 0.75 inches in diameter and of approximately twelve-inches in length. One end of the decoration 230 tube may be closed (with glue for example). The decoration 230 may be drawn over the elongated elastic member 220 and the remaining open end of the decoration 230 may be glued to the elongated member 220 by leaving about 0.5 inches of the elongated member 220 exposed at the proximal end 310.

In one configuration, the end-effector fixture 205 may hold the exposed proximal end 310 of the elongated elastic member 220 at an end-effector angle 240. For example, the angle 240 may be, but is not limited to, approximately 15 degrees. The swaying motion of the end-effector 105 may be caused by the actuator 120 applying the wave excitation 210 with a frequency of approximately 2 Hertz (Hz), and an amplitude of approximately 45 degrees using a rotary-type motor, such as the motor 215 of FIG. 2. In one embodiment, the wiggling and wobbling motion may be achieved by the actuator 105 applying the wave excitation 210 with a frequency of approximately 6 Hz, and an amplitude of approximately 15 degrees. The controller 125 may control the actuator 105 to generate the mechanical transversal wave excitation 210.

FIG. 5A illustrates the decoy system 100 with an upper decoration section 230-a and a lower decoration section 230-

*b*. The decoy system 100 may be an example of the decoy system 100 of FIG. 2, which is an example of the system 100 of FIG. 1. In one configuration, the upper decoration section 230-*a* may cover some or all of the end-effector 105. The lower decoration section 230-*b* may similarly cover some or all of the decoy enclosure 115. The decoration 230 may be constructed from any suitable material that simulates natural life with its appearance, texture, color, scent, and other attributes. For example, the following materials may be used: fabric, leather, strands of flexible fibers, fur-simulating fabric, natural fur, feathers, leaves, or any other suitable material. In one configuration, the lower decoration section 230-*b* may match the upper decoration section 230-*a* in appearance. In addition, the decoration 230 may match the environment in which the decoy system 100 is to be operated. The decoy decoration 230 may be attached to the various components of the decoy system 100 using any suitable means such as, but not limited to, draping and/or affixing the decoration 230 over the elongated elastic member 200 and the decoy enclosure 115. In one example, the mounting means 130 may extend beyond the lower decoration section 230-*b*. In one configuration, the mounting means 130 may be used to secure the decoy system 100 into the ground, into the side of a tree, in a crevice between rocks, and the like.

Referring now to FIG. 5B, the decoy system 100 is further illustrated with the lower decoration section 230-*b* draped and/or affixed over the decoy enclosure 115. The decoy system 100 may be an example of the system 100 of FIG. 2, which is an example of the decoy system of FIG. 1. FIG. 5B illustrates a cross-sectional view of the lower decoration section 230-*b* enclosing the decoy enclosure 115.

Figures 6, 7:
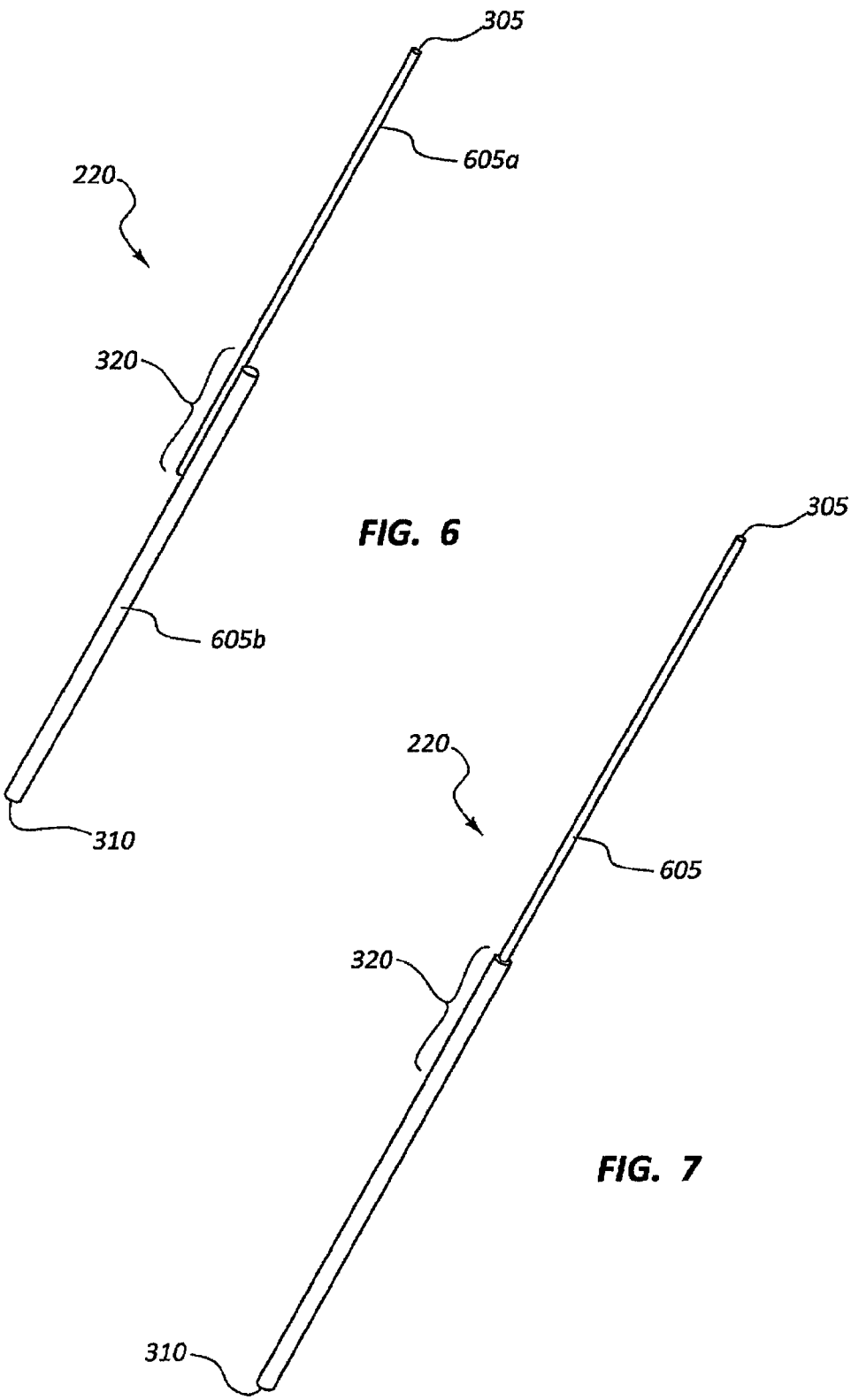
FIGS. 6, 7, and 8 illustrate various example of a non-homogenous elongated elastic member of the end-effector.
Figure 8:
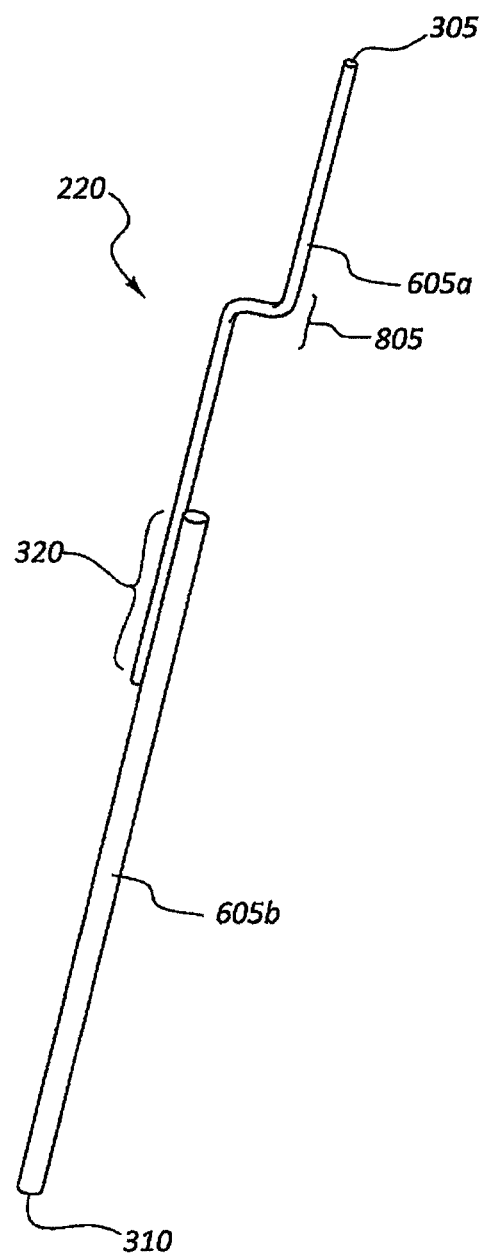

FIGS. 6, 7, and 8 illustrate various example of a non-homogenous elongated elastic member 220 of the end-effector 105. The elastic member 220 illustrated in each of these figures may be an example of the member 220 of FIG. 2. In one configuration, the non-homogenous elongated elastic member 220 may be shaped generally straight rod. The elastic properties of the non-homogenous elongated elastic member 220 may not be homogeneous. In other words, the elastic properties may vary along the length of the elongated elastic member 220 and exhibit discontinuities in elasticity along the length of elongated elastic member 220.

As previously described, the elongated member 220 may have a proximal end 310 and a distal end 305. The proximal end 310 may be driven by the end-effector fixture 205 thereby receiving the mechanical transversal wave excitation 210 from the actuator 120. The distal end 305 may be generally unrestricted. The wave excitation 210 causes a mechanical transversal wave to travel along the non-homogenous elongated elastic member 220 causing motion and elastic deformations along the non-homogenous elongated elastic member 220 and the end-effector 105.

In one embodiment, the non-homogeneous elastic properties of the elongated member 220 may be achieved by one or more of the following: varying the cross-sectional geometry of the elongated member 220, by varying material the elongated member 220 is made of, and by varying longitudinal geometry of the elongated member 220 to introduce discontinuities that cause more abrupt change in elasticity along the elongated elastic member 220.

FIG. 6 and FIG. 7 illustrate one example of the elongated elastic member 220 with diameter changes along the member's length. For example, the elastic member 220 may include a first rod 605-*a* and a second rod 605-*b* having different diameters. The two rods may be attached to each other via the rod interface 320. Together, the two rods may form the non-homogeneous elastic member 220. The rod interface 320 may be accomplished by attaching the rods 605-*a* and 605-*b* with various fastener means, or by bonding them to each other using various adhesives, welding methods, or other suitable techniques. In one configuration, the elongated elastic member 220 may include a single rod 605 whose diameter varies along the length either gradually or abruptly as shown in FIG. 7. In one embodiment the rod 605 may be made of a spring-tempered wire, but any other suitable material may be used to provide a desired elasticity to support the end-effector decoration 230.

The rod interface 320 is one example of elastic discontinuity in the elongated elastic member 220. FIG. 6 illustrates one example, where the interface is accomplished by overlapping and joining the rods 605-*a* and 605-*b*. Thus, the overlap interface section 320 of the elongated member 220 may have different elastic properties with abrupt discontinuities in elasticity at both ends of the overlap section. FIG. 7 illustrates another example in which the cross section of the single rod 605 changes abruptly at the interface 320. As a result, the elastic properties of the elongated member 220 may change abruptly at that location of the interface 320 representing a discontinuity in elastic properties.

FIG. 8 illustrates a kink 805 in the first rod 605-*a* to introduce an elastic discontinuity and substantially alter the elastic properties of the elongated elastic member 220 at the location of the kink 805 in the first rod 605-*a*. The kink 805 may be a simple planar "S-like" shape in the first rod 605-*a*. For elastic deformations of the elongated elastic member 220 in the plane of the kink's "S-like" shape, the turns in the "S-like" shape may behave as a torsion spring. In contrast the straight sections of the first rod 605-*a* and the second rod 605-*b* may behave as a rod spring. For example, when the bending of the elongated member 220 is outside of the plane containing "S-like" kink 805, the elastic properties may be different, because the short section of the "S-like" kink 805 may behave like a torsion bar spring rather than a torsion coil spring. The illustration of the kink 805 in FIG. 8 is an example of creating an elastic discontinuity along the elongated elastic member 220, as well as an example of creating anisotropic elastic response as the direction (or axis) of bending of the elongated elastic member 220 is varied. As a result, the bending of the elongated elastic member 220 as it bends in response to the wave excitation 210 may behave differently at the location of the kink 805. The elastic properties of torsion springs may depend not only on the diameter of the rod, but also on the radius and number of turns. Thus, one can control the elastic properties of the "S-like" kink 805 by altering the radius and number of turns.

In one configuration, the "S-like" kink 805 may also introduce a slight radial displacement between the portions of the first rod section 605-*a* on each side of the kink 805. For example, because the rod segment before the kink 805 and the rod segment after the kink 805 are slightly displaced and not collinear, there may be an additional anisotropic elastic discontinuity introduced in the elastic properties of the elongated elastic member 220. As the elastic member 220 sways or undulates in different directions, the non-collinear segments between to the distal end 305 of the elastic member 220 and the kink 805 may introduce torque onto the non-collinear segment on the other side of the kink 805 (between the kink 805 and the proximal end 310 of the member 220). In one configuration, the rod 605 may experience torsion twist because the displaced rod segment on the far end side of the kink 805 (between the kink 805 and the distal end 305) may experience dynamic forces (caused by inertia and air drag of the end-effector decoration 230) that may be opposed by the torque of the twisting rod segment that is between the kink 805 and the proximate end 310 and the kink 805. As a result, the rod 605 may occasionally behave like a torsion bar spring. In one embodiment, radial displacements of the rod 605 may be substantially small compared to the length of the elastic member 220. This may maintain the general elongated shape of the elastic member 220.

FIG. 9A-FIG. 9E illustrates additional examples of the kink 805 that may be included in the elongated elastic member 220. The kink 805 may be an example of the kink 805 of FIG. 8. FIG. 9A, for example, illustrates one embodiment of a planar "S" shape of the kink 805. FIG. 9B illustrates multiple planar "S" shapes oriented in different planes. The planes may be determined by the axis of the rod 605. FIG. 9C illustrates one example of a bent kink 805 that may serve as an elastic non-homogeneous discontinuity. This may introduce a certain degree of radial displacement in the rod 605. FIG. 9D illustrates one example of the kink 805 as a torsion spring. FIG. 9E illustrates one configuration of the kink 805 as a coil spring. Other variations of the kink 805 may be used to create discontinuities in the non-homogeneous elongated elastic member 220.

Figure 10:
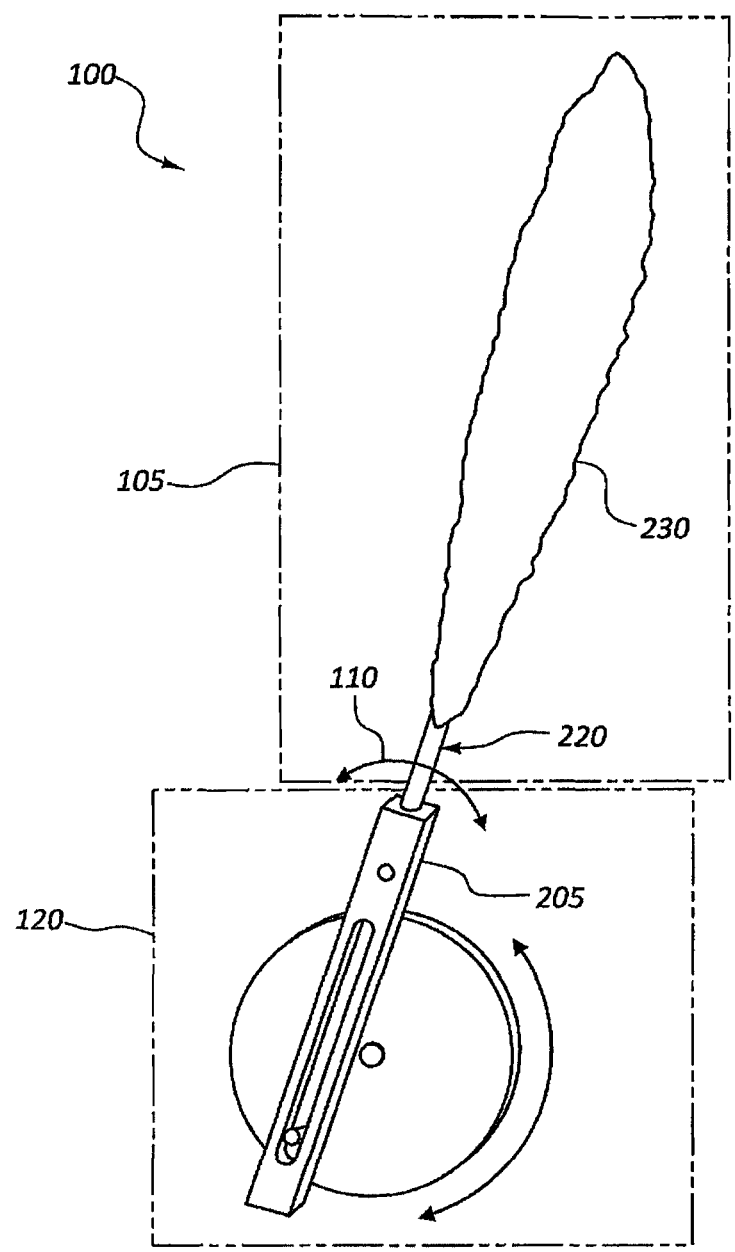
FIG. 10 illustrates one example of the decoy system capable of generating the mechanical transversal wave excitation.

FIG. 10 illustrates one example of the decoy system 100 capable of generating the mechanical transversal wave excitation 110. The decoy system 100 may be an example of the system 100 of FIG. 2, which may be an example of the decoy system 100 of FIG. 1. In one embodiment, the fixture 205 may engage in a back and forth undulating motion in a first plane. As a result of the undulating motion of the fixture 310, the end-effector angle 240 may be achieved by the changing orientations of the undulating fixture 205.

Figure 11:
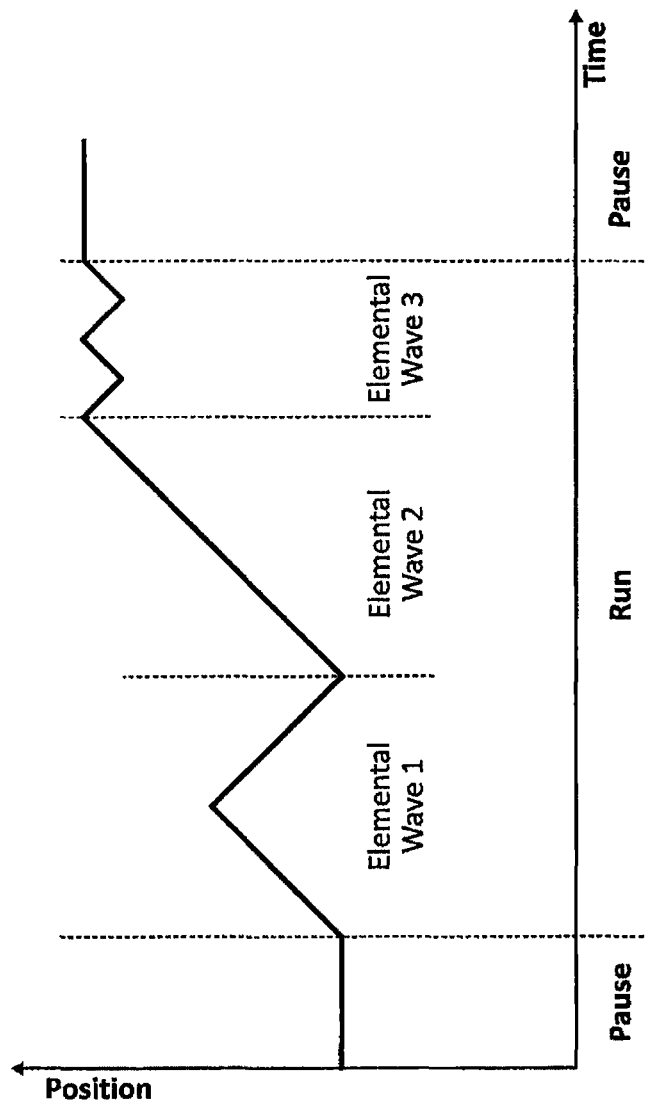
FIG. 11 is a graphical representation of one example of the transversal wave excitation.

FIG. 11 is a graphical representation of one example of the transversal wave excitation 110. The wave excitation may be generated by one or more components of the decoy enclosure 115, such as the actuator 120 and the controller 125 of FIG. 1. The wave excitation 110 may include several elemental waves, each elemental wave having different amplitudes and frequencies, and possibly different shapes. In one example, the represented waveforms illustrates in FIG. 11 are triangular waveform, but other shapes may be used to represent the waveforms, such as, but not limited to, sinusoidal, trapezoidal, etc. One or more elemental waves may be concatenated into a sequence of elemental waves during a run (or motion) interval. The controller 125 may generate a pause during which no wave excitation 110 is generated. The controller 125 may use a preprogrammed sequence of elemental wave sequences and preprogrammed sequence of pauses and run periods to generate a particular wave excitation 110. In one embodiment, the controller 125 may randomly determine one or more properties of each elemental wave, such as, but not limited to, the frequency, amplitude, shape, phase, initial position, and duration (or number of full or martial periods), and the like. Further, the controller 125 may randomly determine the number of elemental waves in the elemental wave sequence, the order of elemental waves in the sequence, and the duration of the pause. The controller 125 may determined the above-mentioned properties at random or according to a preprogrammed sequence.

Figure 12:
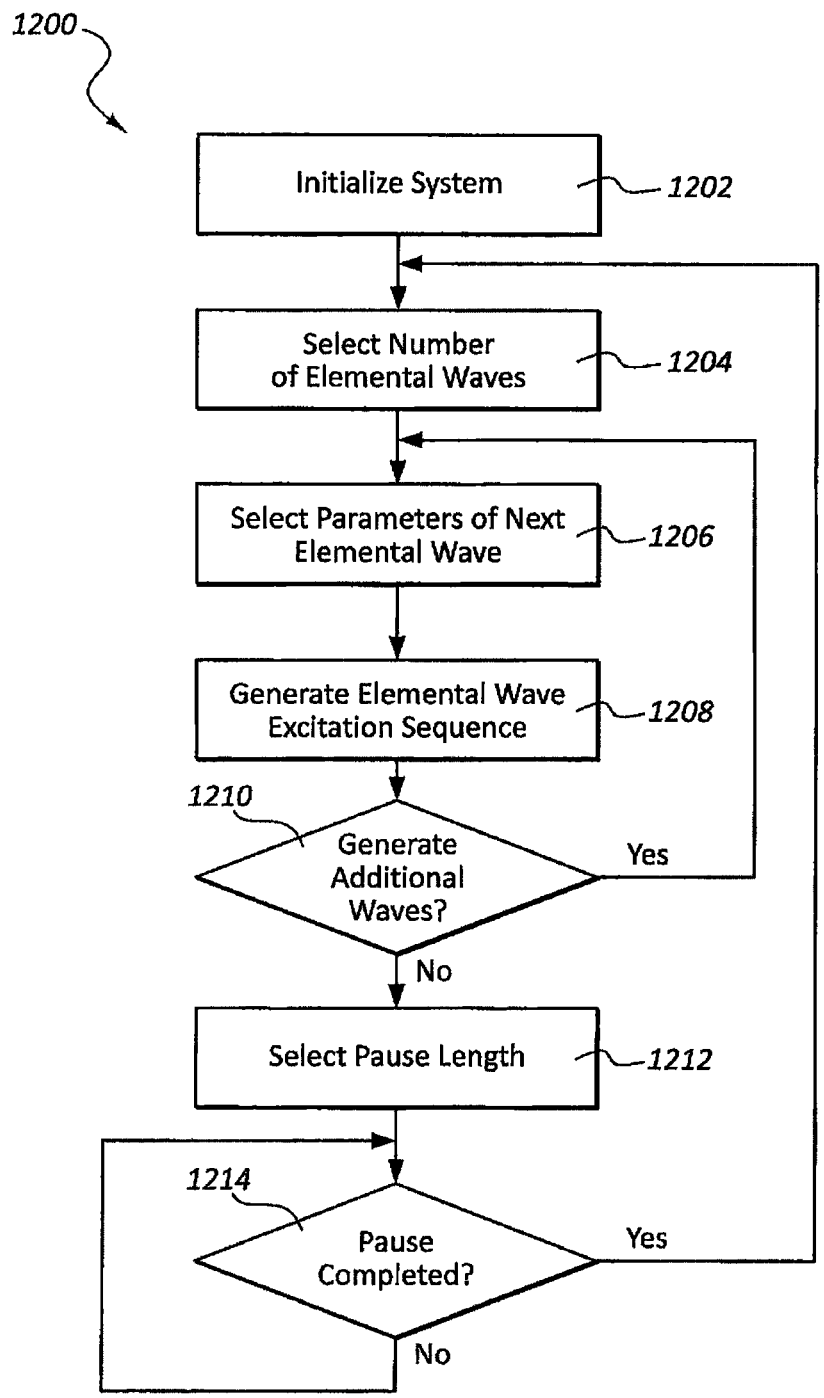
FIG. 12 is a flow chart illustrating one example of a method to determine a particular wave excitation over time.

FIG. 12 is a flow chart illustrating one example of a method 1200 to determine a particular wave excitation 110 over time. The method 1200 may be implemented by the controller 125, for example the controller 125 of FIG. 1. The wave excitation 110 generated may be, but is not limited to, a rotary element wave excitation, as described above in reference to FIG. 2.

At block 1202, the decoy system 100 may be initialed. For example, the system 100 may be powered on. At block 1204, a number of elemental waves may be selected. In one configuration, at block 1206, parameters of the next upcoming wave may be selected. At block 1208, the elemental wave excitation sequence 110 may be generated based on the selected parameters of the upcoming wave. A determination 1210 may be made as to whether additional waves are to be generated. If it is determined 1210 that additional waves should be generated, the method 1200 may return to block 1204 to select a number of elemental waves, and the method 1200 may proceed through blocks 1204-1210 until it is determined 1210 that there are no additional waves to generated. Upon determining 1210 that no additional waves are to be generated, at block 1212, a length of a pause may be selected. In one embodiment, a determination 1214 may be made as to whether the pause has completed. If it is determined 1214 that the pause has not been completed, the method 1200 may enter a loop until it is determined 1214 that the pause has been completed.

FIGS. 13-16 illustrate various embodiments of the fixture 205 of the actuator 120. The fixture 205 illustrated in FIG. 13-16 may be an example of the fixture 205 of FIG. 2. The various configurations of the fixture 205 illustrated in FIGS. 13-16 may provide a substantially immovable connection between the end-effector 105 and the actuator 120 during the operation of the decoy system 100. The fixture 205 may further allow for the separation of the end-effector 105 from the actuator 120 to enable convenient transportation and packing of the decoy system 100 between uses. The fixture 205 may further allow for a quick set up to connect the end-effector 105 to the actuator 120 when the decoy system 100 is to be activated.

Figure 13:
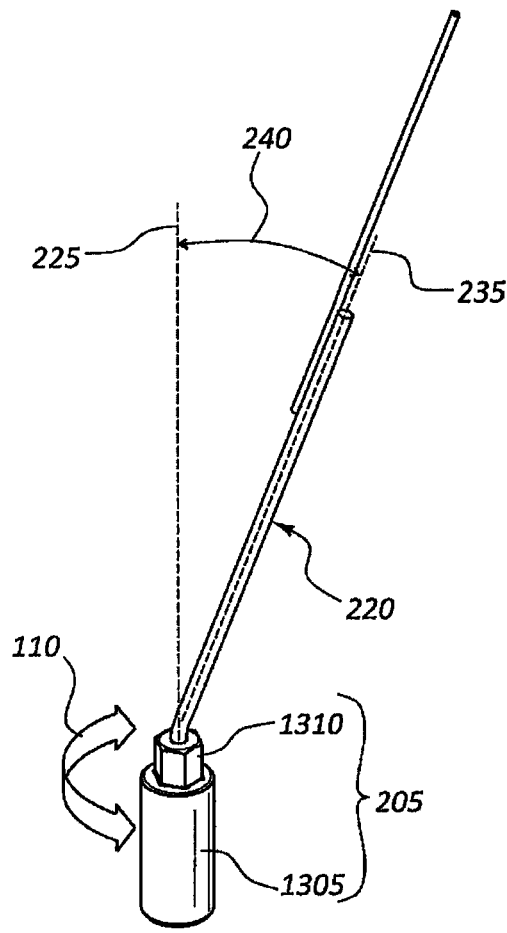
FIG. 13 illustrates one embodiment of the fixture of the actuator.
Figure 14A:
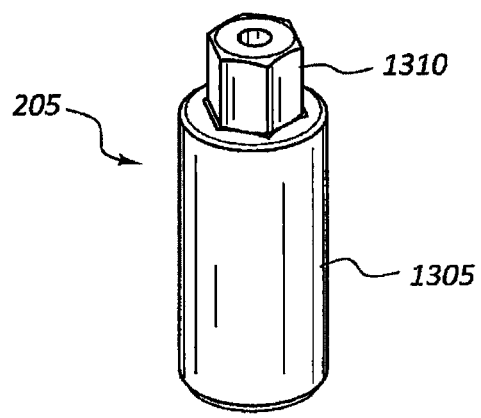
FIG. 14A illustrates a detailed view of a female and male socket used with the actuator.

Referring to FIG. 13, in one example, the fixture 205 may include a keyed female socket 1305 and matching keyed male insert 1310. The male insert 1310 may immovably connect to the elongated elastic member 220 and may maintain the end-effector angle 240 (in case of rotary actuator). A detailed view of the female and male sockets is illustrated in FIG. 14A.

Referring to FIGS. 14B-14-G, the female socket 1305 may include a magnet 1315 for attracting the keyed male insert 1310 and keeping the insert 1310 engaged with the socket 1305. In one example, at least a portion of the keyed male insert 1310 may be made of a ferroelectric material. The socket 1305 may be made of a soft, rigid material, such as, but not limited to, rubber or plastic, to minimize any rattling noise between the socket 1305 and the insert 1310. In another embodiment, the magnet 1315 may be omitted and the holding force between the socket 1305 and the insert 1310 may be provided by friction generated with a tight connection between the socket 1305 and the insert 1310.

The FIG. 205 may further include a first receiver 1320 and a second receiver 1325. The first receiver 1320 may receive the proximal end 310 of the elongated elastic member 220 of the end-effector 105. The second receiver 1320 may receive one end of the mounting means 130.

Figures 15, 16A:
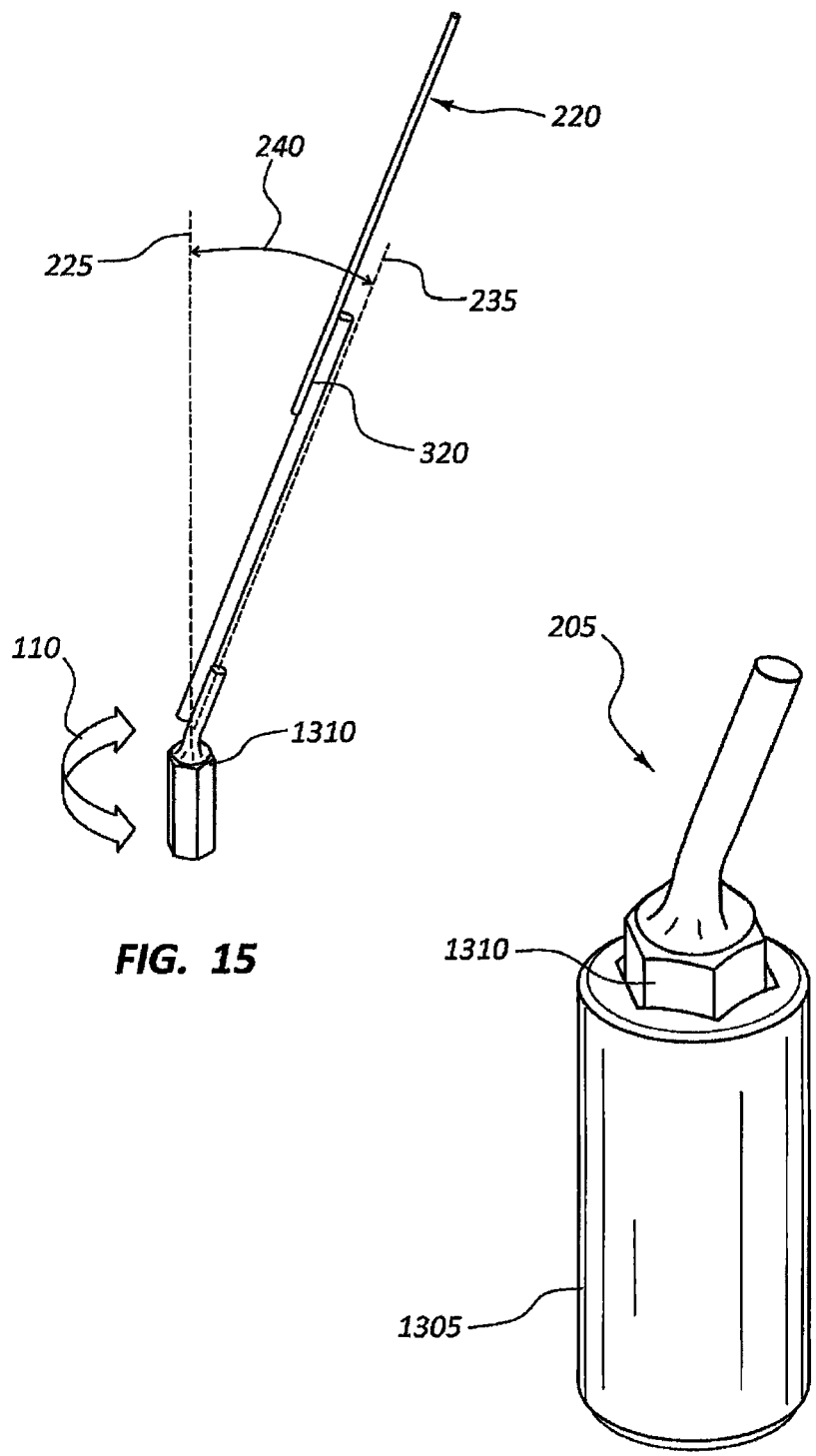
FIG. 15 illustrates another embodiment of the fixture of the actuator.
FIG. 16A illustrates a detailed view of the female and male sockets.

Referring now to FIG. 15, another embodiment of the fixture 205 is illustrated. The male insert 1310 may be inserted into the female socket 1305, as illustrated in FIG. 16A. The male insert 1310 may be secured in the socket 1305 by the magnet 1315, as illustrated in FIGS. 16B-FIG. F. In one embodiment, the insert 1310 may include the first receiver 1320 that may receive a portion of the elongated elastic member 220. For example, the proximal end 310 of the member 220 may be placed in the first receiver 1320 to secure the member 220 to the fixture 205. The socket 1305 may include the second receiver 1325, which may receive a portion of the mounting means 130. For example, one end of a rod may be inserted in the second receiver 1325 to secure the one end of the rod to the fixture 205 and the opposite end of the rod may be inserted in the group, the trunk of a tree, in a crevice between rocks, etc.

Figure 17:
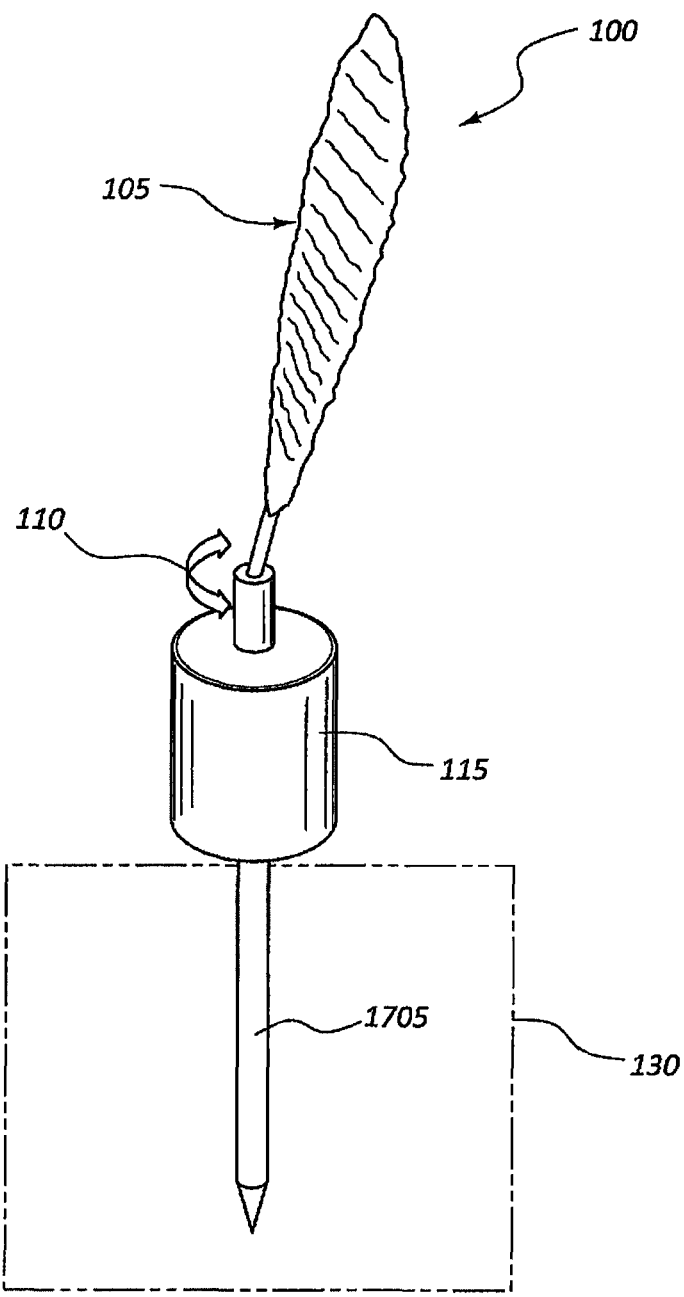
FIG. 17 illustrate one example of the mounting means of the decoy system when the general axis of the end-effector is oriented substantially upright.
Figure 18:
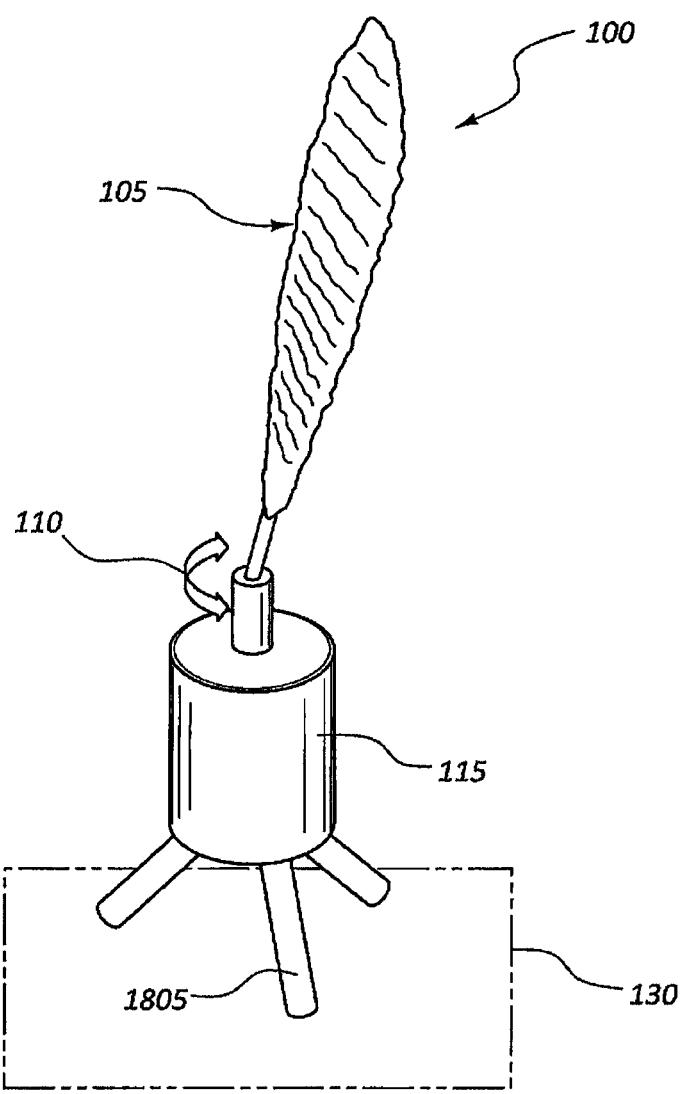
FIG. 18 illustrates a support structure to support the components of the decoy system.

FIG. 17 illustrate one example of the mounting means 130 of the decoy system 100 (for example, in a field) when the general axis of the end-effector 105 is oriented substantially upright. The decoy system 100 may be an example of the system 100 of FIG. 2, which may be an example of the decoy system 100 of FIG. 1. In one embodiment, a ground stake 1705 may be used to support the other components of the decoy system 100. Referring to FIG. 18, a set of legs 1805 may support the remaining components of the decoy system 100 atop a mounting surface (such as, for example, the field). As previously stated, the decoy system 100 may generate life-like motion in any orientation. As a result, the system 100 may be mounted via the mounting means 130 at an angle in respect to a vertical direction (e.g., sticking out of a bush). The system 100 may be mounted at an upside down orientation (e.g., hanging out of the tree).

Figure 19:
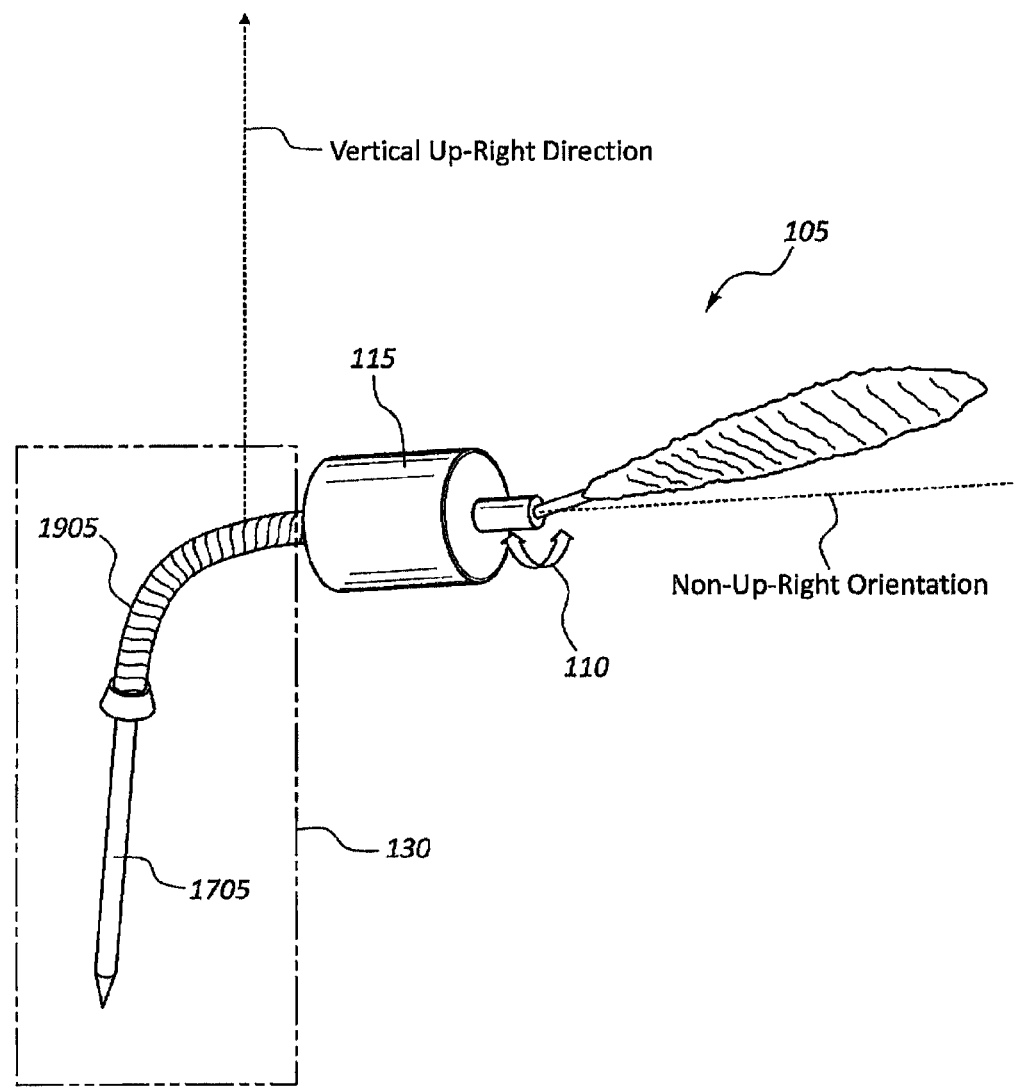
FIG. 19. illustrates one embodiment of the decoy system with a flexible link as part of the mounting means.

FIG. 19 illustrates one embodiment of the decoy system 100 with a flexible link 1905 as part of the mounting means 130. The flexible link 1905 may allow the decoy system 100 to be positioned in various orientations. For example, the link 1905 may bend to cause the decoy system 100 to be positioned horizontally, vertically, or any combination between these two orientations. In one embodiment, the flexible link 1905 may be connected to the ground stake 1705, which may be used to secure the decoy system 100 in the desired position.

Figure 20:
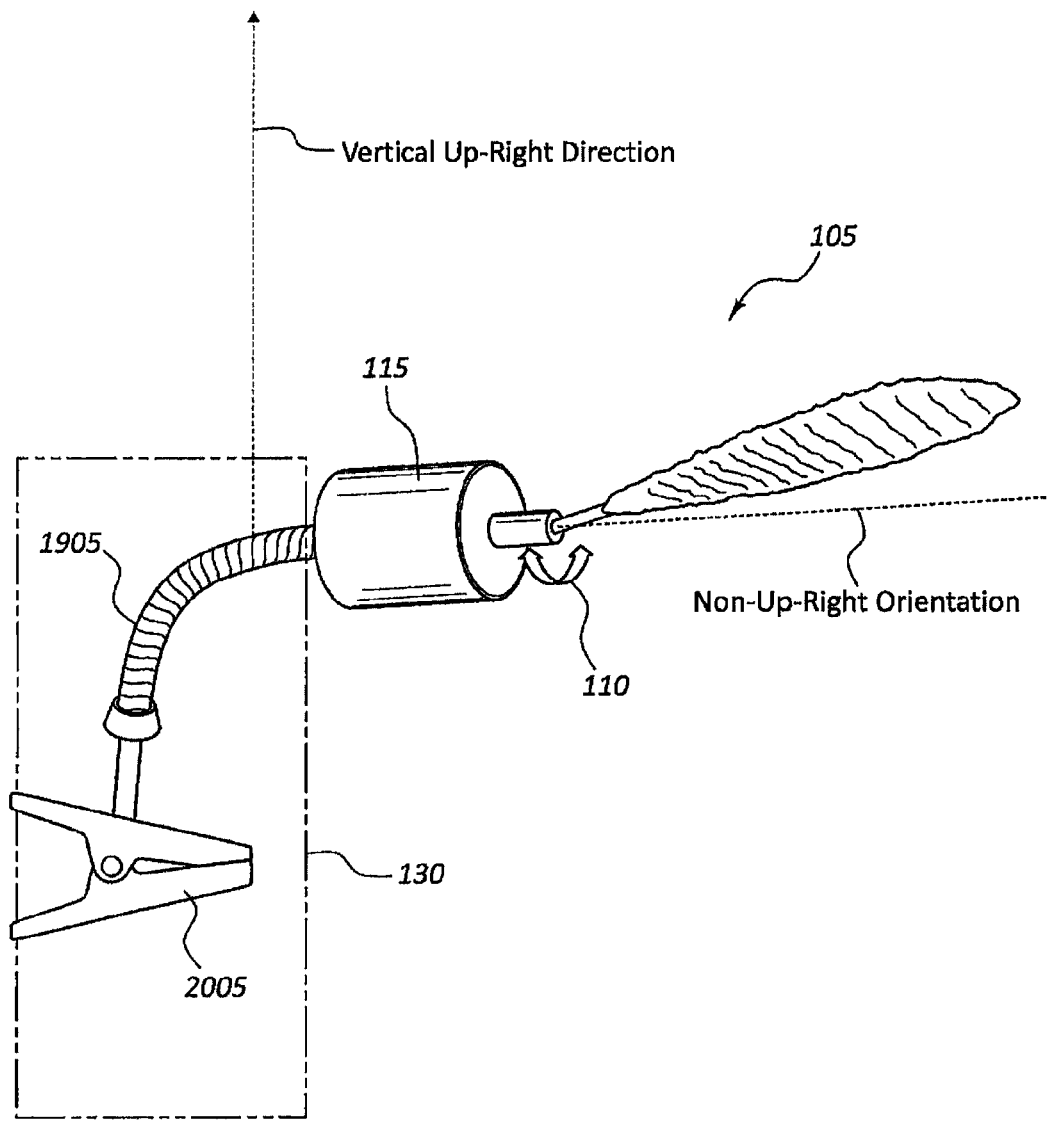
FIG. 20 illustrates one example of the decoy system with the flexible link attached to a clamp.

FIG. 20 illustrates one example of the decoy system 100 with the flexible link 1905 attached to a clamp 2005. The clamp 2005 may allow the decoy system 100 to be attached to various articles to secure the system 100 in place. For example, the clamp 2005 may be attached to a tree branch, a rock, and the like. The flexible link 1905 may allow the decoy system 100 to be positioned in a horizontal orientation, a vertical orientation, or any combination of these two orientations.

Figure 21:
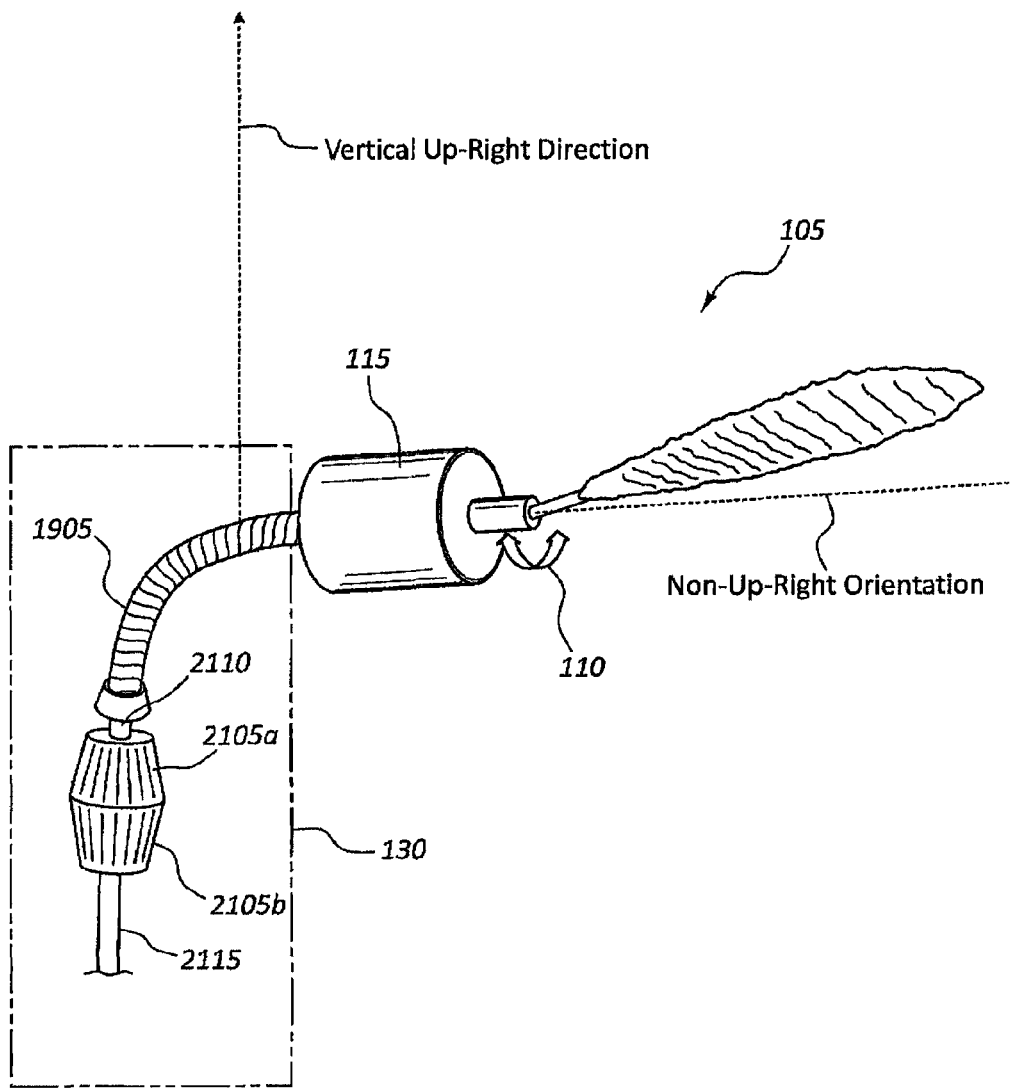
FIG. 21 illustrates another embodiment of the mounting means used with the decoy system.

FIG. 21 illustrates another embodiment of the mounting means 130 used with the decoy system. The mounting means 130 may include the flexible link 1905, as previous described. The various components of the mounting means 130 may be connected to each other by threading them into each other, and ultimately threading the last link to the decoy enclosure 115. In one configuration, one link may include a separable connection that may be quickly and firmly snapped in place. In this way a base portion 2115 of the mounting means 130 may be pre-mounted in the field via, for example, a stake pushed into the ground, a clip clipped to a branch, etc. The remainder of the mounting means 130 that attaches to the decoy enclosure 115, may be aligned and connected to the base portion 2115 without treading or significantly turning the decoy system 100 or decoy portions of the mounting means 130. One possibility for this quick connection may include clips 2105-a, 2105-b that thread into each other by rotating them around a quick connection stem 2110. The treads of the clips 2105-a, 2105-b may be course so that a quarter turn of a first clip 2105-a in respect to a second clip 2105-b may produce a firm connection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. An apparatus to attract predatory animals, comprising:
   an end-effector comprising an elastic member with non-homogenous elastic properties;
   a fixture attached to a proximal end of the elastic member; and
   an actuator attached to the fixture and configured to generate a transversal wave excitation, the transversal wave excitation configured to propagate from the proximal end of the elastic member to a distal end of the elastic member.

2. The apparatus of claim 1, wherein the elastic member comprises a changing diameter along the length of the elastic member.

3. The apparatus of claim 1, wherein the elastic member comprises a changing material along the length of the elastic member.

4. The apparatus of claim 1, wherein the elastic member comprises a changing shape along the length of the elastic member.

5. The apparatus of claim 1, wherein the elastic member comprises a first rod of a first diameter connected at a first attachment point to a second rod of a second diameter.

6. The apparatus of claim 1, wherein the elastic member further comprises a kink, loop, or bend along the length of the elastic member.

7. The apparatus of claim 1, wherein attachment of the proximal end of the elastic member to the fixture forms an angle.

8. The apparatus of claim 1, further comprising a controller with a processor and memory, the controller attached to the actuator, the controller configured to:
    determine at least one property of the transversal wave excitation; and
    transmit signals to the actuator indicating the at least one property of the transversal wave excitation.

9. The apparatus of claim 8, wherein the at least one property comprises a wave frequency, a wave amplitude, a wave phase, a wave initial position, a wave spectral content, or a wave duration.

10. The apparatus of claim 8, wherein the controller is further configured to:
    change the at least one property of the transversal wave excitation; and
    transmit signals to the actuator indicating the change in the at least one property of the transversal wave excitation.

11. The apparatus of claim 8, wherein the controller is further configured to:
    transmit signals to the actuator instructing the actuator to terminate the generation of the traversal wave excitation and enter a pause interval; and
    transmit signals to the actuator at the conclusion of the pause interval instructing the actuator to commence the generation of the transversal wave excitation.

12. The apparatus of claim 8, wherein the controller further comprises a radio frequency (RF) module configured to receive command signals remotely relating to the at least one property of the transversal wave excitation, the termination of the generation of the transversal wave excitation, or the commencement of the generation of the transversal wave excitation.

13. A method to attract attention of predatory animals, comprising:
    attaching a proximal end of an elastic member of an end-effector to a fixture, wherein the elastic member comprises non-homogenous elastic properties; and
    attaching the fixture to an actuator, wherein the actuator is configured to generate a transversal wave excitation, the transversal wave excitation configured to propagate from the proximal end of the elastic member to a distal end of the elastic member.

14. The method of claim 13, further comprising changing the diameter of the elastic member along the length of the elastic member.

15. The method of claim 13, further comprising changing the material of the elastic member along the length of the elastic member.

16. The apparatus of claim 13, further comprising changing the shape of the elastic member along the length of the elastic member.

17. The method of claim 13, further comprising connecting a first rod of a first diameter to a second rod of a second diameter at a first attachment point to form the elastic member.

18. The method of claim 13, further comprising forming a kink, loop, or bend along the length of the elastic member.

19. The method of claim 13, further comprising forming an angle at the attachment between the proximal end of the elastic member and the fixture.

20. The method of claim 13, further comprising:
    determining, by a controller attached to the actuator, at least one property of the transversal wave excitation; and
    transmitting, by the controller, signals to the actuator indicating the at least one property of the transversal wave excitation.

21. The method of claim 20, wherein at least one property comprises a wave frequency, a wave amplitude, a wave phase, a wave initial position, a wave spectral content, or a wave duration.

22. The method of claim 20, further comprising:
    changing, by the controller, the at least one property of the transversal wave excitation; and
    transmitting, by the controller, signals to the actuator indicating the change in the at least one property of the transversal wave excitation.

23. The method of claim 20, further comprising:
    transmitting, by the controller, signals to the actuator instructing the actuator to terminate the generation of the transversal wave excitation and enter a pause interval; and
    transmitting, by the controller, signals to the actuator at the conclusion of the pause interval instructing the actuator to commence the generation of the transversal wave excitation.

24. The method of claim 20, further comprising receiving, by the controller, command signals remotely via a radio frequency (RF) module, wherein the remote signals relate to the at least one property of the transversal wave excitation, the termination of the generation of the transversal wave excitation, or the commencement of the generation of the transversal wave excitation.

25. The method of claim 13, wherein generating the transversal wave excitation comprises rotating the fixture around a fixture axis.

26. An animated decoy apparatus for attracting the attention of a predatory animal, comprising:
    an end-effector comprising an elastic member with non-homogenous elastic properties;
    an end-effector covering simulating at least a portion of an animal body, the covering attached to at least a portion of the elastic member;
    a fixture attached to a proximal end of the elastic member, the fixture transmits a mechanical transversal wave excitation to the proximal end of the elastic member, the excitation producing a wave to propagate from the proximal end to a distal end of the elastic member;
    an actuator configured to generate the mechanical transversal wave excitation to drive the fixture;
    a controller configured to determine properties of the wave excitation and control the actuator to generate the wave excitation; and
    a mounting component configured to mount the decoy apparatus in a location.

27. The apparatus of claim 26, wherein the elastic member comprises kinks, loops, or bends along at least a portion of the length of the elastic member.

28. The apparatus of claim 26, wherein the elastic member comprises a first elastic rod with varying elastic properties along the length of the rod.

29. The apparatus of claim 26, wherein the elastic member comprises a plurality of elastic rods, each rod exhibiting different elastic properties, wherein each of the rods are connected to another rod in an axial manner to form a chain of rods that preserves the elongated shape of the elastic member.

30. The apparatus of claim 29, wherein the plurality of rods comprise spring-tempered wire, wherein the diameter of the rods decreases from a larger to a smaller diameter as the chain of rods is traversed from the proximal end to the distal end.

31. The apparatus of claim 29, wherein connections between the rods are formed by longitudinally overlapping end sections of adjacent rods, forming overlap sections with stiffer elastic properties exhibiting discontinuities in elasticity at both ends of each overlap section.

32. The apparatus of claim 27, wherein the kinks, loops or bends cause a first section of the elastic member on one side of the kink, loop, or bend to be non-collinear with a second section of the elastic member on the opposite side of the kink, loop, or bend.

33. The apparatus of claim 26, wherein the actuator comprises an electric rotary motor configured to drive and rotate the fixture around a motor axis, and wherein the proximal end connects to the fixture to create an angle between a general longitudinal axis of the end-effector and the motor axis.

34. The apparatus of claim 26, wherein the controller is further configured to:
    select a first time instance to change at least one property of the wave excitation;
    select a second time instance to stop generating the wave excitation; and
    select a third time instance to begin the wave excitation.

35. The apparatus of claim 34, wherein the controller is further configured to generate electric signals to control undulating motion of the actuator in response to the select at least one property of the wave excitation.

36. The apparatus of claim 26, wherein the mounting component comprises a mounting base comprised of at least one of:
    a ground stake for placing the decoy atop ground;
    a set of feet for placing the decoy atop a surface; and
    a clip for clipping the decoy to an object in decoy operating environment.

* * * * *